United States Patent [19]

Godfrey

[11] Patent Number: 5,029,881
[45] Date of Patent: Jul. 9, 1991

[54] JAW TEETH WITH ELASTOMERIC CONNECTOR

[75] Inventor: Bruce Godfrey, Sterling Heights, Mich.

[73] Assignee: GBP Corporation, Warren, Mich.

[21] Appl. No.: 379,424

[22] Filed: Jul. 13, 1989

[51] Int. Cl.$^5$ ............................................. B23B 31/12
[52] U.S. Cl. ..................... 279/57; 279/1 Q; 279/1 ME
[58] Field of Search ............... 279/1 ME, 1 Q, 55–59, 279/41 R, 42, 43, 74, 46 R, 47, 48, 49, 50, 51, 52, 54, 68

[56] References Cited

U.S. PATENT DOCUMENTS

| | | | |
|---|---|---|---|
| 2,211,344 | 8/1940 | Montgomery | 279/46 |
| 2,448,423 | 8/1948 | Dodge | 279/1 ME |
| 2,466,129 | 4/1949 | Stoner | 279/1 ME |
| 2,535,105 | 12/1950 | Vidal | 279/58 |
| 2,896,954 | 7/1959 | Ernest | 279/1 Q |
| 2,943,729 | 7/1960 | Dalrymple | 279/1 Q |
| 3,815,930 | 6/1974 | Mattes | 279/1 Q X |
| 4,352,612 | 10/1982 | Benatti | 279/1 Q X |
| 4,858,938 | 8/1989 | Terwilliger | 279/1 Q X |

Primary Examiner—Larry I. Schwartz
Assistant Examiner—Robert Schultz
Attorney, Agent, or Firm—Dykema Gossett

[57] ABSTRACT

A chuck jaw assembly for use in an apparatus for setting fasteners is disclosed having an elastomeric connector, or retaining member, that holds the jaw teeth of the chuck jaw assembly in the proper axial and circumferentially spaced positions with respect to each other. The jaw teeth have a forward conical section and a rear cylindrical section with a groove formed at an outer periphery. A ring portion of the retaining member is received in the groove and spacer elements that extend inwardly from an inner periphery of the ring portion are received in circumferential gaps between the jaw teeth to ensure that they are maintained in the proper circumferentially spaced positions. A mold having the proper configuration for forming the retaining member is disclosed. An elastomeric material is injected into the mold and is allowed to cure. The retaining member is then removed from the mold. The jaw teeth are assembled to the retaining member and may be either permanently bonded or simply removably snapped upon the retaining member.

9 Claims, 1 Drawing Sheet

JAW TEETH WITH ELASTOMERIC CONNECTOR

BACKGROUND OF THE INVENTION

This invention relates to a chuck jaw assembly for a fastener setting apparatus. More particularly, this invention relates to an elastomeric connector for maintaining the jaw teeth of a chuck jaw assembly in a predetermined relationship with respect to each other.

Apparatus for setting fasteners are well known. In general, these devices have an outer body to receive a fastener and a chuck jaw assembly within the outer body for gripping and setting the fastener. Typical prior art devices are shown in U.S. Pat. No. 4,344,311 and No. 4,057,980. With such devices, problems arise in maintaining the jaw teeth that grip a fastener in proper axial and circumferential positions with respect to each other.

A prior art apparatus for setting fasteners is shown in U.S. Pat. No. 4,347,728 in which a chuck jaw assembly is disclosed that has a tubular elastomeric sleeve member disposed behind and connected to the fastener engaging jaw teeth to maintain the jaw teeth in predetermined positions with respect to each other. This arrangement is undesirable since large stresses will be placed on the connection between the sleeve member and the jaw teeth, which must flex radially inwardly and outwardly and return to a predetermined position. With repeated use of the apparatus, the jaw teeth may simply snap away from the sleeve member.

Another prior art device is shown in U.S. Pat. No. 4,598,572 in which the jaw teeth are received in pockets in an elastomeric tubular member. With this device, the jaw teeth have a rear portion that is ridged so that they are gripped within the pockets. These ridges require special machining increasing the cost of the jaw teeth. Further, as the jaw ieeth become worn with use they may tend to drift outwardly from the pockets. Also, the teeth are restrained to an undesirable extent since the pockets disclosed by this patent have a portion holding the jaw teeth that is radially inward from the jaw teeth inner diameter.

U.S. Pat. No. 3,595,593 discloses a collet for use in jaws that are maintained in proper axial alignment by O-rings. While an arrangement such as shown in this patent would have advantages over the prior art patents discussed above, some problems still remain. A complex arrangement of springs and spacers is utilized to maintain proper circumferential spacing. The arrangement is overly complex and still may not adequately maintain the desired circumferential spacing between the jaws and also may not be useful in an apparatus for setting fasteners.

A still further prior art apparatus for setting fasteners uses only an O-ring to hold the jaw teeth. The O-ring is received in a groove formed in the rear portion of the jaw teeth. This device lacks means for circumferentially spacing the jaw teeth.

U.S. Pat. No. 3,610,641 shows a drill chuck assembly that has a relatively complex apparatus for separating the chuck elements. This arrangement is complex and may not be useful in an apparatus for setting fasteners or for a jaw chuck assembly that must be capable of sliding.

It is therefore an object of the present invention to disclose a chuck jaw assembly for use in an apparatus for setting fasteners that will solve the problems faced by the prior art. More particularly, it is an object of the present invention to disclose a chuck jaw assembly with an elastomeric connector, or retaining member, that maintains the jaw teeth in predetermined axial and circumferentially spaced positions.

SUMMARY OF THE INVENTION

A chuck jaw assembly having a plurality of fastener engaging jaw teeth and an elastomeric connector according to the present invention is disposed in an apparatus for setting fasteners. The elastomeric connector, or retaining member, ensures that each jaw tooth is maintained in a predetermined axial and circumferentially spaced position with respect to the other jaw teeth.

The apparatus employing the jaw teeth of this invention typically includes an outer body extending along a central axis which slidably receives a tubular collet member having a tapered internal surface at a forward end. The chuck jaw assembly is received within the tubular collet member and is free to move axially. A separate resilient tubular sleeve is positioned behind the chuck jaw assembly. When a fastener is received within the outer body, a trigger is manually actuated and the tubular collet member is moved rearwardly. The chuck jaw assembly stays relatively stationary due to the resilient tubular sleeve with the tapered inner surface of the tubular collet member sliding rearwardly with respect to the chuck jaw assembly. The jaw teeth are forced inwardly by the internally tapered surface of the collet member to grip the fastener. In this way, the fastener may be firmly set. The chuck jaw assembly will rocket rearwardly after setting the fastener and this force is absorbed by the resilient tubular sleeve.

The chuck jaw assembly disclosed by the present invention includes a plurality of fastener engaging jaw teeth spaced circumferentially about a central axis. The jaw teeth are frusto-conically tapered at an outer periphery and slide along the tubular collet member as it is displaced along the central axis. As the tubular collet member is displaced, the jaw teeth are forced radially inwardly into gripping engagement with a fastener.

Each of the jaw teeth extends over a circumferential extent equal to a portion of a cylinder defined parallel to the central axis. Each jaw tooth has a conical section extending from a forward end of the chuck jaw assembly rearwardly and radially outwardly to an intermediate point on the jaw teeth. A cylindrical section extends from the intermediate point rearwardly to the rear end of each of the jaw teeth. A groove is formed in the cylindrical section and extends over a first axial extent spaced between the intermediate point and the rear end of the chuck jaw assembly.

A flexible jaw retaining member, or elastomeric connector, having a cylindrical ring portion of an axial extent slightly larger than axial extent of the groove maintains the plurality of jaw teeth in the predetermined axial and circumferential relationship with respect to each other. The ring portion has an inner diameter slightly less than the outer diameter of the groove and an outer diameter approximately equal to the nominal outer diameter of the cylindrical section. The retaining member has a plurality of spacer elements extending radially inwardly from the inner diameter of the ring portion to a second inner diameter equal to or slightly greater than the inner diameter of the jaw teeth. In the disclosed embodiment, there are equal numbers of jaw teeth and spacer elements, i.e. three of each.

The ring portion is pressed into the groove with the spacer elements being received in gaps circumferentially between adjacent jaw teeth. Since the ring portion has an inner diameter less than the outer diameter of the groove a force from the ring portion continuously biases the jaw teeth radially inwardly to hold the chuck jaw assembly together as a unit. The circumferential ends of each jaw tooth are forced into the spacer elements by the radially inward force from the ring portion. This force maintains the chuck jaw assembly as a unit but still allows the jaw teeth to pivot radially inwardly as the tubular collet member slides over them.

Thus, the jaw teeth are maintained in predetermined circumferentially spaced positions while at the same time maintained in a fixed axial position. Since no part of the retaining member is radially within the jaw teeth, they may easily pivot radially inwardly to grip a fastener. Also, since the ring portion continuously biases the jaw teeth together, any wear will be automatically compensated for.

A method for making the retaining member of the present invention is also disclosed. A mold body having a first bore conforming to the outer diameter of the final ring portion is generally cup-shaped and has a passage extending through a closed face at one end. A plug or shaft mounts a mold member that has an outer periphery with a groove corresponding to the shape of the desired ring portion. The mold member has a plurality of circumferentially spaced, radially inwardly extending grooves communicating with the groove formed at the outer periphery of the mold member. The shaft mounting the mold member is received in the passage in the closed face of the mold body. When an elastomeric material is injected into the mold, it will pass into the groove at the outer periphery and radially inwardly into the inwardly extending grooves to form the spacer elements. A closure member is placed on the shaft to close off the mold, and the elastomer is allowed to cure.

Once the elastomer has cured, the retaining member is removed from the mold and the jaw teeth are inserted within it. As explained above, the final retaining member assures that the jaw teeth remain axially and circumferentially fixed with respect to each other.

DETAILED DESCRIPTION OF A PREFERRED EMBODIMENT

Figure 1:
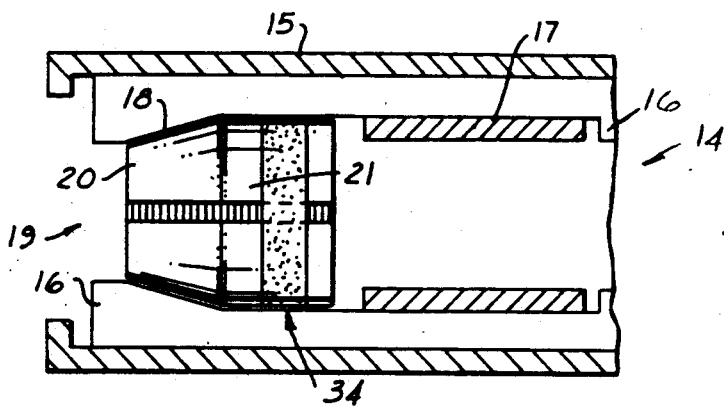
FIG. 1 is a partial cross-sectional view showing the chuck jaw assembly of the present invention disposed in a typical apparatus for setting fasteners.

As shown in FIG. 1, an apparatus 14 for setting fasteners includes an outer body 15 and a tubular collet member 16 slidably received within outer body 15. Outer body 15 is adapted to receive a fastener, and upon actuation of a trigger, as by for example manual actuation, tubular collet member 16 is moved rearwardly. A chuck jaw assembly 19 is slidably received within tubular collet member 16 and is biased forwardly in the opposite direction of movement of tubular collet member 16 by a resilient tubular sleeve 17. Chuck jaw assembly 19 remains relatively stationary, due to the bias of sleeve 17, when tubular collet member 16 is moved rearwardly. Tubular collet member 16 has a tapered portion 18 formed at a forward end which forces the jaw teeth of chuck jaw assembly 19 radially inwardly as the tapered portion 18 slides along chuck jaw assembly 19. Chuck jaw assembly 19 has a forward conical section 20 extending from a forward end rearwardly, and radially outwardly, to an axially intermediate position. A cylindrical section 21 extends from conical section 20 rearwardly to the end of chuck jaw assembly 19.

Figure 2:
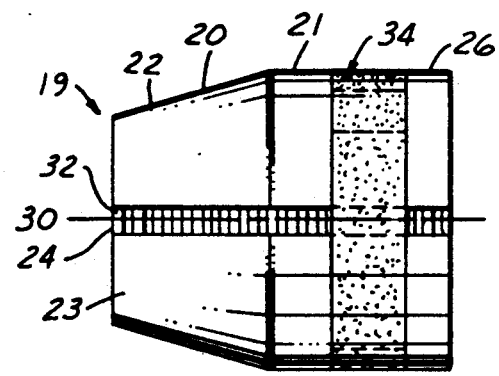
FIG. 2 is a side view of the chuck jaw assembly of the present invention.

FIG. 2 illustrates chuck jaw assembly 19 having jaw teeth 22, 23 and 24 held by a retaining member or elastomeric connector 34 that is positioned between the intermediate point marking the beginning of the cylindrical section and the rearward end of each jaw tooth. Section 26 of jaw teeth 22, 23 and 24 is shown rearwardly of elastomeric connector 34. Serrated teeth 32 can be seen at an inner periphery of jaw tooth 24 for gripping a fastener. Jaw teeth 22 and 23 have similar serrated teeth 32.

Figure 3:
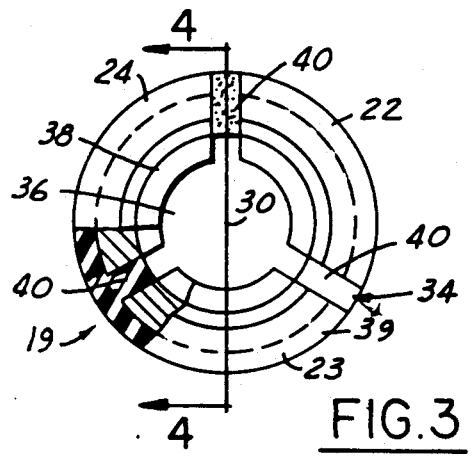
FIG. 3 is a cross-sectional view through the chuck jaw assembly of the present invention.

FIG. 3 shows jaw teeth 22, 23 and 24 spaced circumferentially about central axis 30. An opening 36 is defined by jaw teeth 22, 23, 24 for receiving a fastener member which will be gripped by a forward end 38, and the serrated teeth 32, of each jaw tooth 22, 23 and 24. Retaining member 34 has ring portion 39 and spacer members 40 which are disposed in circumferential gaps between jaw teeth 22, 23 and 24.

Figure 4:
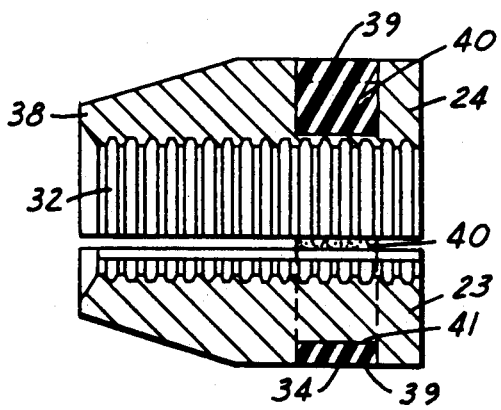
FIG. 4 is a cross-sectional view along lines 4—4 as shown in FIG. 3.

The serrated teeth 32 on jaw tooth 24 and opposed jaw tooth 23 can be seen in FIG. 4. Retaining member 34 is disposed within groove 41 that extends radially inwardly from the outer periphery of jaw teeth 22, 23 and 24, while spacer members 40 are shown in gaps between jaw teeth 22, 23 and 24.

Each of jaw teeth 22, 23 and 24 extend over a circumferential extent equal to a portion of a cylinder defined parallel to central axis 30. Since ring portion 39 has an inner diameter less than the outer diameter of groove 41, a force from ring portion 39 biases jaw teeth 22, 23 and 24 radially inwardly to hold chuck jaw assembly 19 together as a unit. The circumferential ends of each jaw tooth 22, 23 and 24 are forced into spacer elements 40 by the radially inward force from ring portion 39. This force maintains the chuck jaw assembly 19 as a unit but still allows the jaw teeth 22, 23 and 24 to pivot radially inwardly as they slide along the tapered portion 18 of the tubular collet member 16.

Thus, jaw teeth 22, 23 and 24 are maintained in a predetermined circumferentially spaced positions while at the same time maintained in fixed axial positions.

Retaining member 34 extends radially outwardly to approximately the outer diameter of cylindrical section 20. Preferably, spacer elements 40 extend radially inwardly to the inner diameter of jaw teeth 22, 23 and 24.

Figure 5:
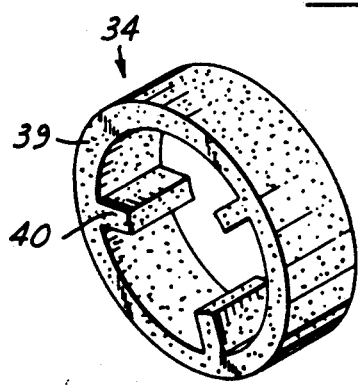
FIG. 5 is a perspective view of the retaining member of the present invention.

FIG. 5 is a perspective view of retaining member 34. Ring portion 39 extends for an axial extent that is greater than the axial extent of groove 41 and has spacer elements 40 extending radially inwardly from an inner periphery.

Figure 7:
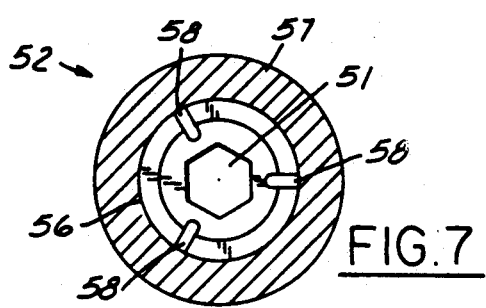
FIG. 7 is a cross-sectional view through the mold member for forming the retaining member of the present invention.
Figure 6:
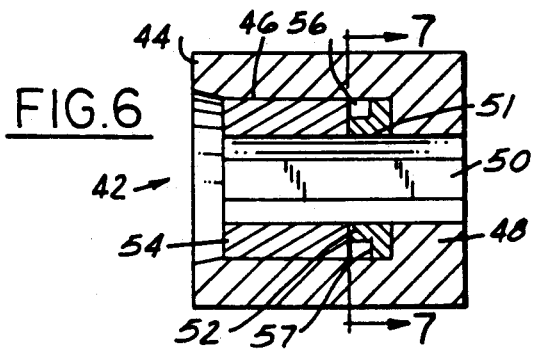
FIG. 6 is a cross-sectional view showing the mold assembly for manufacturing the retaining member of the present invention.

A method for forming the elastomeric connector, or retaining member 34 of the present invention will be disclosed with reference to FIGS. 6 and 7. As shown in FIG. 6, a mold body 44 having a cylindrical forward portion 46 forming a bore of a first diameter and a closed face 48 having a passage of a second diameter much smaller than the first diameter receives an assembly 42 for molding the retaining member 34. Assembly 42 has shaft 50 receiving a mold member 52 and passing through the passage in closed face 48 of mold body 44 such that mold member 52 abuts face 48. Mold member 52 has an outer periphery with a groove 56 that corresponds to the desired final shape of ring portion 39.

As shown in FIG. 7, mold member 52 has an inner bore 51 that receives shaft 50 and also has radially inwardly extending grooves 58 that communicate with groove 56. Elastomeric material is inserted into mold body 44 and will pass into groove 56 and inwardly extending grooves 58. Closure 54 is placed on the shaft to enclose the space defined by grooves 56 and 58. The material in groove 56 forms ring portion 39 while the material in grooves 58 form spacer elements 40.

The elastomer material is allowed to cure, the closure member 54 is then removed and retaining member 34 is removed from mold member 52. Jaw teeth 22, 23 and 24 may then be assembled to retaining member 34 by either permanently bonding them or simply snapped them onto retaining member 24 such that they may be easily removed.

A preferred embodiment of the present invention has been disclosed; however, certain modifications would be obvious to one of ordinary skill in the art. Thus, the following claims should be reviewed to determine the true scope and content of the present invention.

I claim:

1. A chuck jaw assembly comprising:
   a plurality of jaw teeth spaced circumferentially around a central axis such that there are gaps between adjacent ones of said jaw teeth, each said gap extending throughout the axial extent of each said jaw tooth, said jaw teeth having a conical section at a forward end extending rearwardly and radially outwardly to an intermediate point on said jaw teeth, a cylindrical section extending from said intermediate point rearwardly to a rear end of said jaw teeth, said cylindrical section having a first outer diameter and a first inner diameter;
   a flexible jaw retaining member received on said cylindrical section and retaining said jaw teeth in predetermined axial positions with respect to each other and having spacer elements extending radially inwardly into said gaps between said jaw teeth, said spacer elements having an inner diameter greater than said first inner diameter such that such spacer elements do not extend radially inwardly beyond said first inner diameter.

2. A chuck jaw assembly as recited in claim 1, and wherein said jaw teeth have a groove formed in said cylindrical section and extending for a first axial extent, said first axial extent being spaced between said intermediate point and said rear end, said groove having a second outer diameter, said second outer diameter being less than said first diameter, said flexible jaw retaining member having a ring portion of an axial extent greater than said first extent, said ring portion having an inner diameter less than said second outer diameter, said spacer elements extending radially inwardly from said ring section, said ring section being received in said groove.

3. A chuck jaw assembly as recited in claim 2, and wherein said ring section having a third outer diameter approximately equal to said first outer diameter.

4. A chuck jaw assembly as recited in claim 3, and wherein said retaining member is formed of an elastomeric material.

5. An apparatus for use in setting fasteners, comprising:
   an outer body having a central axis;
   an internally tapered body within said outer body;
   a plurality of jaw teeth within said internally tapered body and spaced circumferentially around said central axis, there being gaps between adjacent ones of said jaw teeth, said jaw teeth being frusto-conically tapered and displaced in one direction relative to said internally tapered body along said central axis such that said jaw teeth are forced radially inwardly by said internally tapered body so as to grippingly engage a fastener disposed at said central axis, said jaw teeth having a conical section at a forward end that extends rearwardly and radially outwardly to an intermediate point on said jaw teeth, a cylindrical section extending from said intermediate point rearwardly to a rear end of said jaw teeth, said cylindrical section having a first nominal outer diameter and a first inner diameter;
   a groove formed in said cylindrical section and extending for a first axial extent between said intermediate point and said rear end, said groove having a second outer diameter, said second outer diameter being less than said first outer diameter;
   a flexible jaw retaining member having a ring portion of an axial extent greater than said first axial extent, said ring portion having an inner diameter less than said second outer diameter and a outer diameter equal to said first outer diameter, said retaining member having a plurality of spacer elements extending radially inwardly from said inner diameter of said ring portion to a second inner diameter equal to or greater than said first inner diameter, there being the same number of jaw teeth and said spacer elements; and
   said ring portion being received in said groove, said spacer elements extending radially inwardly into said gaps to retain said jaw teeth in fixed axial and circumferential positions with respect to each other.

6. An apparatus as recited in claim 5, and wherein there are three of said jaw teeth and three of said spacers.

7. An apparatus as recited in claim 5, and wherein said retaining member being formed from elastomeric material.

8. An apparatus as recited in claim 5, and wherein said jaw teeth having serrated teeth at an inner peripheral portion thereof.

9. An apparatus as recited in claim 5, and wherein there being a portion of said cylindrical section extending forwardly from said rear end of said jaw teeth, having said first outer diameter, and spacing said groove forwardly from said rear end of said jaw teeth.

* * * * *